US011235755B2

(12) United States Patent
Woodley

(10) Patent No.: US 11,235,755 B2
(45) Date of Patent: Feb. 1, 2022

(54) APPARATUS AND METHOD FOR CONTROLLING MOVEMENT OF A VEHICLE

(71) Applicant: JAGUAR LAND ROVER LIMITED, Warwickshire (GB)

(72) Inventor: Jonathan Woodley, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 159 days.

(21) Appl. No.: 16/479,046

(22) PCT Filed: Dec. 13, 2017

(86) PCT No.: PCT/EP2017/082652
§ 371 (c)(1),
(2) Date: Jul. 18, 2019

(87) PCT Pub. No.: WO2018/137842
PCT Pub. Date: Aug. 2, 2018

(65) Prior Publication Data
US 2019/0367014 A1    Dec. 5, 2019

(30) Foreign Application Priority Data
Jan. 30, 2017   (GB) ..................... 1701446

(51) Int. Cl.
*B60W 30/06*   (2006.01)
*G05D 1/00*    (2006.01)

(52) U.S. Cl.
CPC .......... *B60W 30/06* (2013.01); *G05D 1/0011* (2013.01); *G05D 1/0055* (2013.01); *G05D 2201/0213* (2013.01); *G07C 2205/02* (2013.01)

(58) Field of Classification Search
CPC ... B60W 30/06; G05D 1/0011; G05D 1/0055; G05D 2201/0213; G07C 2205/02
(Continued)

(56) References Cited

U.S. PATENT DOCUMENTS

2011/0106339 A1   5/2011   Phillips et al.
2011/0221600 A1*  9/2011   Kinsel ................ H02H 3/335
                                              340/650
(Continued)

FOREIGN PATENT DOCUMENTS

EP         0490805 A1    6/1992
WO    2014/076386 A1    5/2014
(Continued)

OTHER PUBLICATIONS

Combined Search and Examination Report under Sections 17 and 18(3) for Application No. GB1701446 5 dated Jun. 23, 2017.
(Continued)

*Primary Examiner* — Muhammad Shafi
(74) *Attorney, Agent, or Firm* — Carlson, Gaskey & Olds, P.C.

(57) ABSTRACT

Embodiments of the present invention provide apparatus (101) for controlling movement of a vehicle (100), the apparatus comprising processing means (10) configured to: receive first signals from a receiving means (202) in dependence on received transmitted signals from a remote control device (200) indicating a requested motion of a vehicle (100); receive one or more second signals indicative of a diagnostic device (400) being in operative communication with the vehicle (100); and provide an output signal for controlling movement of the vehicle (100) in dependence on the requested motion. The output signal is inhibited if: a diagnostic device (400) is in operative communication with the vehicle (100) and a maintenance mode has not been
(Continued)

activated, as determined from the first signals or from one or more third signals; or if a door (402) or the bonnet (404) is open, unless a diagnostic device (400) is in operative communication with the vehicle (100); or if the vehicle weight is not being borne by the wheels (111, 112, 114, 115) unless a diagnostic device (400) is in operative communication with the vehicle (100). Associated methods are also provided.

6 Claims, 9 Drawing Sheets

(58) Field of Classification Search
USPC .............................................................. 701/2
See application file for complete search history.

(56) References Cited

U.S. PATENT DOCUMENTS

| 2012/0197513 | A1 | 8/2012 | Gatti et al. |
| 2013/0311004 | A1 | 11/2013 | Okamura et al. |
| 2014/0222252 | A1 | 8/2014 | Matters et al. |
| 2017/0011561 | A1* | 1/2017 | Makke ................... G07C 5/085 |

FOREIGN PATENT DOCUMENTS

| WO | 2015/147140 A1 | 10/2015 |
| WO | 2016/169065 A1 | 10/2016 |

OTHER PUBLICATIONS

International Search Report and Written Opinion of the International Searching Authority for International application No. PCT/EP2017/082652 dated May 23, 2018.

* cited by examiner

APPARATUS AND METHOD FOR CONTROLLING MOVEMENT OF A VEHICLE

TECHNICAL FIELD

The present disclosure relates to controlling movement of a vehicle. In particular, but not exclusively, it relates to controlling movement of a road vehicle such as a car in a remote control mode of operation and to ways to prevent inadvertent activation of the remote control mode whilst the vehicle is undergoing maintenance.

Aspects of the invention relate to an apparatus for controlling movement of a vehicle, a system for controlling movement of a vehicle, a vehicle, a method of controlling movement of a vehicle, and a computer program.

BACKGROUND

Suitably equipped vehicles can be operated in a remote control drive mode via a remote device, such as a smart phone having a suitable remote control drive program, to provide convenient means for an operator of the vehicle to control movement the vehicle from a position outside of the vehicle. This may, for example, be to allow the operator to get a more immediate and encompassing view of the terrain, to allow the operator to carry out a task outside the vehicle, such as opening and subsequently closing a gate across the vehicle's path and manoeuvring the vehicle through the gate, or to park the vehicle—particularly in a restricted space.

One problem with such an arrangement is how to maximize the safety of the vehicle and people within the vicinity of the vehicle, including the vehicle operator, while the vehicle is being remotely controlled and while the vehicle is under maintenance.

It is an aim of the present invention to address this problem.

SUMMARY OF THE INVENTION

Aspects of the invention relate to an apparatus for controlling movement of a vehicle, a system for controlling movement of a vehicle, a vehicle, a method of controlling movement of a vehicle, and a computer program.

According to an aspect of the invention, there is provided apparatus for controlling movement of a vehicle, the apparatus comprising processing means configured to: receive first signals from a receiving means in dependence on received transmitted signals from a remote control device indicating a requested motion of a vehicle; receive one or more second signals indicative of a diagnostic device being in operative communication with the vehicle; determine, from the first signals or from one or more third signals, whether a maintenance mode has been activated; and provide an output signal for controlling movement of the vehicle in dependence on the requested motion. The output signal is inhibited if a diagnostic device is in operative communication with the vehicle and the maintenance mode has not been activated.

According to another aspect of the invention, there is provided apparatus for controlling movement of a vehicle, the apparatus comprising processing means configured to: receive first signals from a receiving means in dependence on received transmitted signals from a remote control device indicating a requested motion of a vehicle; receive one or more second signals indicative of a diagnostic device being in operative communication with the vehicle; receive a bonnet open or door open signal; and provide an output signal for controlling movement of the vehicle in dependence on the requested motion. The output signal is inhibited if a door or the bonnet is open unless a diagnostic device is in operative communication with the vehicle.

According to yet another aspect of the invention, there is provided apparatus for controlling movement of a vehicle, the apparatus comprising processing means configured to: receive first signals from a receiving means in dependence on received transmitted signals from a remote control device indicating a requested motion of a vehicle; receive one or more second signals indicative of a diagnostic device being in operative communication with the vehicle; receive one or more weight on wheels signals in dependence on whether the vehicle weight is being borne by the wheels; and provide an output signal for controlling movement of the vehicle in dependence on the requested motion. The output signal is inhibited if the vehicle weight is not being borne by the wheels unless a diagnostic device is in operative communication with the vehicle.

Whilst a vehicle that is equipped with remote control operability is undergoing maintenance, it can be envisaged that an inadvertent operation of the associated remote control device could result in one or more of the vehicle's components being activated (such as the brakes, powertrain or steering) and this unexpected activation could lead to injury of personnel in close proximity to the vehicle. This may happen, for example, if the vehicle owner has deposited the vehicle at a service centre and inadvertently requests motion of the vehicle through the remote control device (e.g. a smartphone) whilst still in range of the vehicle.

So, to mitigate the risk of maintenance personnel becoming injured due to an inadvertent operation of the remote control device, the remote control operability may be disabled temporarily (inhibited) when a vehicle is undergoing maintenance. However, it may be desirable for the maintenance personnel to be able to test the functionality of the remote control operation, so the inhibition of the remote control mode can be overridden by deliberate action by the maintenance personnel.

According to the first of the above-described embodiments, whether or not the vehicle is undergoing such maintenance can be determined on the basis of a detected connection between the vehicle and a diagnostic device. The connection may be an on-board diagnostics (OBD) port, or it may be a wireless connection, established over a suitable wireless communications link. The remote control mode is automatically disabled on detection of the connection of the diagnostic device to the vehicle, but this may be overridden by entering a maintenance mode. Or, to look at it conversely, the remote control mode of operation is inhibited if the vehicle is connected to diagnostics and the maintenance mode has not been enabled. The maintenance mode may be entered via the remote control device or by other means, such as through the diagnostic device or through the vehicle's control system.

According to the second of the above-described embodiments, the determination of the vehicle undergoing maintenance is made by virtue of detection of the bonnet or a door being open. The remote control mode is automatically disabled on detection of such a bonnet or door open signal. However, in this instance this may be overridden by connecting a diagnostic device to the vehicle, in the manner described above.

According to the third of the above-described embodiments, the determination of the vehicle undergoing maintenance is made by virtue of detection of there being no weight on the wheels, as would occur when the vehicle is raised on a lift above a maintenance pit, for example. The remote control mode is automatically disabled on detection of such a 'no weight on wheels' signal. However, this may also be overridden by connecting a diagnostic device to the vehicle, in the manner described above.

For each of these embodiments, operation of the remote control mode during a maintenance operation requires at least two distinct and deliberate actions: A) connection of a diagnostic device and activation of a maintenance mode; B) opening a bonnet or a door on the vehicle and connecting a diagnostic device; and C) raising the vehicle off the ground so as to remove the weight on the wheels and connecting a diagnostic device.

For the second or the third embodiments, the processing means may be configured to determine, from the first signals or from one or more third signals, whether a maintenance mode has been activated, and the output signal is inhibited if the maintenance mode not been activated. Thus, as an added layer of security, to make use of the remote control mode, not only must the diagnostic device be connected, but also the maintenance mode must have been enabled.

In some embodiments, activation of the maintenance mode requires a specific user input to the remote control device, and an indication of the maintenance mode activation status is received with the first signals in dependence on the specific user input being detected, or an indication of the maintenance mode activation status is received with the third signals which are received from the receiving means in dependence on received transmitted signals from the remote control device separate from the first signals.

Activation of the maintenance mode may require at least two distinct user inputs. These may be 'activate' and 'confirm' steps on a single device (such as the remote control device or smartphone), or separate actions on different devices (such as one action on the remote control device and another on the vehicle control system or on the diagnostic device. At least one of the user inputs may be input via a user interface on the vehicle. At least one of the user inputs is input via a diagnostic device that is in operative communication with the vehicle.

Receiving one or more second signals indicative of a diagnostic device being in operative communication with the vehicle may comprise receiving the second signals from an on-board diagnostics (OBD) port.

Alternatively, receiving one or more second signals indicative of a diagnostic device being in operative communication with the vehicle may comprise receiving the second signals from a receiving means in dependence on received transmitted signals from the diagnostic device. So, the determination of the connection of the diagnostic device may be made by virtue of a physical connection or by a wireless connection.

The processing means may comprise an electronic processor electrically coupled to an electronic memory device having instructions stored therein, the electronic processor having an electrical input for receiving the first signals, second and third signals.

According to another aspect of the invention, there is provided a system for controlling the movement of a vehicle comprising an apparatus as described above, and a receiving means for receiving the transmitted signals from a remote control device via a wireless local area network.

According to another aspect of the invention, there is provided a vehicle comprising an apparatus or a system as described above.

According to an aspect of the invention, there is provided an apparatus for controlling movement of a vehicle, as described above, wherein:
said processing means comprises an electronic processor electrically coupled to an electronic memory device having instructions stored therein, the electronic processor having an electrical input for receiving the first signals and the second signals; and
said processing means is configured to access the memory device and execute the instructions such that it is operable to receive one or more second signals indicative of a diagnostic device being in operative communication with the vehicle; determine, from the first signals or from one or more third signals, whether a maintenance mode has been activated; and provide an output signal for controlling movement of the vehicle based on the requested motion, wherein the output signal is inhibited if a diagnostic device is in operative communication with the vehicle and the maintenance mode has not been activated.

According to another aspect of the invention, there is provided an apparatus for controlling movement of a vehicle, as described above, wherein:
said processing means comprises an electronic processor electrically coupled to an electronic memory device having instructions stored therein, the electronic processor having an electrical input for receiving the first signals and the second signals; and
said processing means is configured to access the memory device and execute the instructions such that it is operable to receive first signals from a receiving means in dependence on received transmitted signals from a remote control device indicating a requested motion of a vehicle; to receive one or more second signals indicative of a diagnostic device being in operative communication with the vehicle; to receive a bonnet open or door open signal; and to provide an output signal for controlling movement of the vehicle based on the requested motion, wherein the output signal is inhibited if a door or the bonnet is open unless a diagnostic device is in operative communication with the vehicle.

According to another aspect of the invention, there is provided an apparatus for controlling movement of a vehicle, as described above, wherein:
said processing means comprises an electronic processor electrically coupled to an electronic memory device having instructions stored therein, the electronic processor having an electrical input for receiving the first signals and the second signals; and
said processing means is configured to access the memory device and execute the instructions such that it is operable to receive first signals from a receiving means in dependence on received transmitted signals from a remote control device indicating a requested motion of a vehicle; to receive one or more second signals indicative of a diagnostic device being in operative communication with the vehicle; to receive one or more weight on wheels signals in dependence on whether the vehicle weight is being borne by the wheels; and to provide an output signal for controlling movement of the vehicle based on the requested motion, wherein the output signal is inhibited if the vehicle weight is not being borne by the wheels unless a diagnostic device is in operative communication with the vehicle According to one aspect of the invention, there is provided a method of controlling movement of a vehicle, the method comprising: receiving first signals from a receiving means in dependence on received transmitted signals from a remote control device indicating a requested motion of a vehicle; receiving one or more second signals indicative of a diagnostic device being in operative communication with the vehicle; determining, from the first signals or from one or more third signals, whether a maintenance mode has been activated; and providing an output signal for controlling movement of the vehicle in dependence on the requested motion. The output signal is inhibited if a diagnostic device is in operative communication with the vehicle and the maintenance mode has not been activated.

According to another aspect of the invention, there is provided a method of controlling movement of a vehicle, the method comprising: receiving first signals from a receiving means in dependence on received transmitted signals from a remote control device indicating a requested motion of a vehicle; receiving one or more second signals indicative of a diagnostic device being in operative communication with the vehicle; receiving a bonnet open or door open signal; and providing an output signal for controlling movement of the vehicle in dependence on the requested motion. The output signal is inhibited if a door or the bonnet is open unless a diagnostic device is in operative communication with the vehicle.

According to yet another aspect of the invention, there is provided a method of controlling movement of a vehicle, the method comprising: receiving first signals from a receiving means in dependence on received transmitted signals from a remote control device indicating a requested motion of a vehicle; receiving one or more second signals indicative of a diagnostic device being in operative communication with the vehicle; receiving one or more weight on wheels signals in dependence on whether the vehicle weight is being borne by the wheels; and providing an output signal for controlling movement of the vehicle in dependence on the requested motion. The output signal is inhibited if the vehicle weight is not being borne by the wheels unless a diagnostic device is in operative communication with the vehicle.

The method may comprise determining, from the first signals or from one or more third signals, whether a maintenance mode has been activated; and the output signal is inhibited if the maintenance mode not been activated.

Determining whether a maintenance mode has been activated may comprise verifying at least two distinct user inputs.

Providing an output signal may comprise providing an output signal to at least one of: a powertrain controller, a transmission controller, a brake controller, and a steering controller to cause the vehicle to move in accordance with the requested motion.

According to a further aspect of the invention, there is provided a computer program that, when run on a processor, performs a method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only, with reference to the accompanying figures, in which.

DETAILED DESCRIPTION

Figure 1:
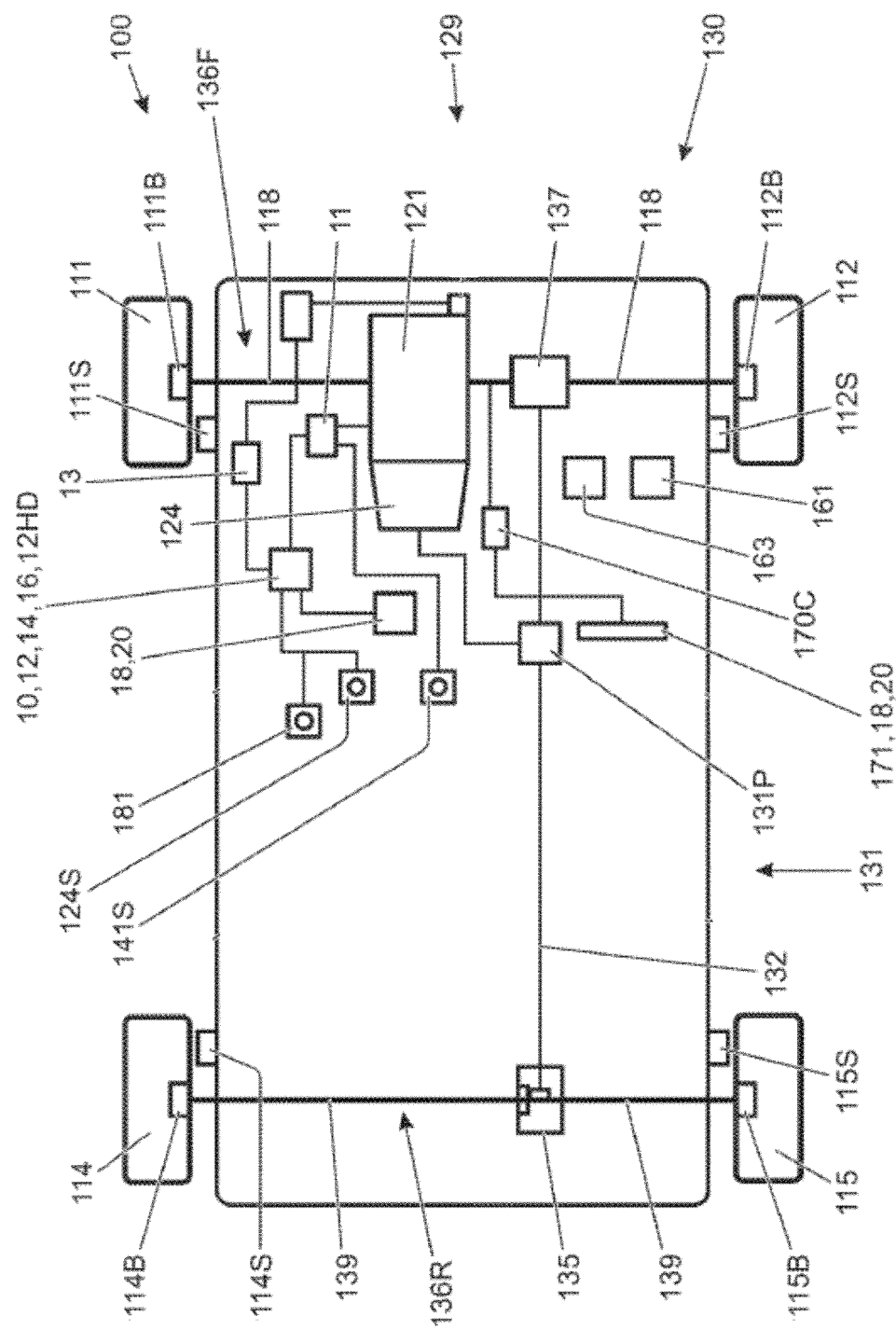
FIG. 1 shows a schematic view of a vehicle suitable for use with a remote control drive system according to the invention.

The figures illustrate an apparatus 101 for controlling movement of a vehicle 100, the apparatus comprising processing means 10 configured to: receive first signals from a receiving means 202 in dependence on received transmitted signals from a remote control device 200 indicating a requested motion of a vehicle 100; receive one or more second signals indicative of a diagnostic device 400 being in operative communication with the vehicle 100; determine, from the first signals or from one or more third signals, whether a maintenance mode has been activated; and provide an output signal for controlling movement of the vehicle 100 in dependence on the requested motion. The output signal is inhibited if a diagnostic device 400 is in operative communication with the vehicle 100 and the maintenance mode has not been activated.

The figures also illustrate an apparatus 101 for controlling movement of a vehicle 100, the apparatus comprising processing means 10 configured to: receive first signals from a receiving means 202 in dependence on received transmitted signals from a remote control device 200 indicating a requested motion of a vehicle 100; receive one or more second signals indicative of a diagnostic device 400 being in operative communication with the vehicle 100; receive a bonnet open or door open signal; and provide an output signal for controlling movement of the vehicle 100 in dependence on the requested motion. The output signal is inhibited if a door or the bonnet is open unless a diagnostic device 400 is in operative communication with the vehicle 100.

The figures yet further illustrate an apparatus 101 for controlling movement of a vehicle 100, the apparatus comprising processing means 10 configured to: receive first signals from a receiving means 202 in dependence on received transmitted signals from a remote control device 200 indicating a requested motion of a vehicle 100; receive one or more second signals indicative of a diagnostic device 400 being in operative communication with the vehicle; receive one or more weight on wheels signals in dependence on whether the vehicle weight is being borne by the wheels 111, 112, 114, 115; and provide an output signal for controlling movement of the vehicle 100 in dependence on the requested motion. The output signal is inhibited if the vehicle weight is not being borne by the wheels 111, 112, 114, 115 unless a diagnostic device 400 is in operative communication with the vehicle 100.

In addition, the figures illustrate a method of controlling movement of a vehicle 100, the method comprising: receiving first signals from a receiving means 202 in dependence on received transmitted signals from a remote control device 200 indicating a requested motion of a vehicle 100; receiving one or more second signals indicative of a diagnostic device 400 being in operative communication with the vehicle 100; determining, from the first signals or from one or more third signals, whether a maintenance mode has been activated; and providing an output signal for controlling movement of the vehicle 100 in dependence on the requested motion. The output signal is inhibited if a diagnostic device 400 is in operative communication with the vehicle 100 and the maintenance mode has not been activated.

The figures also illustrate a method of controlling movement of a vehicle 100, the method comprising: receiving first signals from a receiving means 202 in dependence on received transmitted signals from a remote control device 200 indicating a requested motion of a vehicle 100; receiving one or more second signals indicative of a diagnostic device 400 being in operative communication with the vehicle 100; receiving a bonnet open or door open signal; and providing an output signal for controlling movement of the vehicle 100 in dependence on the requested motion. The output signal is inhibited if a door 402 or the bonnet 404 is open unless a diagnostic device 400 is in operative communication with the vehicle 100.

The figures also further illustrate a method of controlling movement of a vehicle 100, the method comprising: receiving first signals from a receiving means 202 in dependence on received transmitted signals from a remote control device 200 indicating a requested motion of a vehicle 100; receiving one or more second signals indicative of a diagnostic device 400 being in operative communication with the vehicle 100; receiving one or more weight on wheels signals in dependence on whether the vehicle weight is being borne by the wheels 111, 112, 114, 115; and providing an output signal for controlling movement of the vehicle in dependence on the requested motion. The output signal is inhibited if the vehicle weight is not being borne by the wheels 111, 112, 114, 115 unless a diagnostic device 400 is in operative communication with the vehicle 100.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission. Moreover, embodiments of the invention are suitable for use in vehicles having other types of powertrain, such as battery electric vehicles, fuel cell powered vehicles, and hybrids.

In the embodiment of FIG. 1 the transmission 124 may be set to one of a plurality of transmission operating modes, being a park mode P, a reverse mode R, a neutral mode N, a drive mode D or a sport mode S, by means of a transmission mode selector dial 124S. The selector dial 124S provides an output signal to a powertrain controller 11 in response to which the powertrain controller 11 causes the transmission 124 to operate in accordance with the selected transmission mode. Accordingly, in this embodiment a transmission controller (not shown) is incorporated into the powertrain controller 11. However, in other embodiments the transmission controller may be a separate element in operable communication with the controller 10.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two-wheel drive/four-wheel drive vehicles. In the embodiment of FIG. 1 the transmission 124 is releasably connectable to the auxiliary driveline portion 131 by means of a power transfer unit (PTU) 131P, allowing operation in a two-wheel drive mode or a four-wheel drive mode. It is to be understood that embodiments of the invention may be suitable for vehicles having more than four wheels or where only two wheels are driven, for example two wheels of a three-wheeled vehicle or four-wheeled vehicle or a vehicle with more than four wheels.

Figure 3:
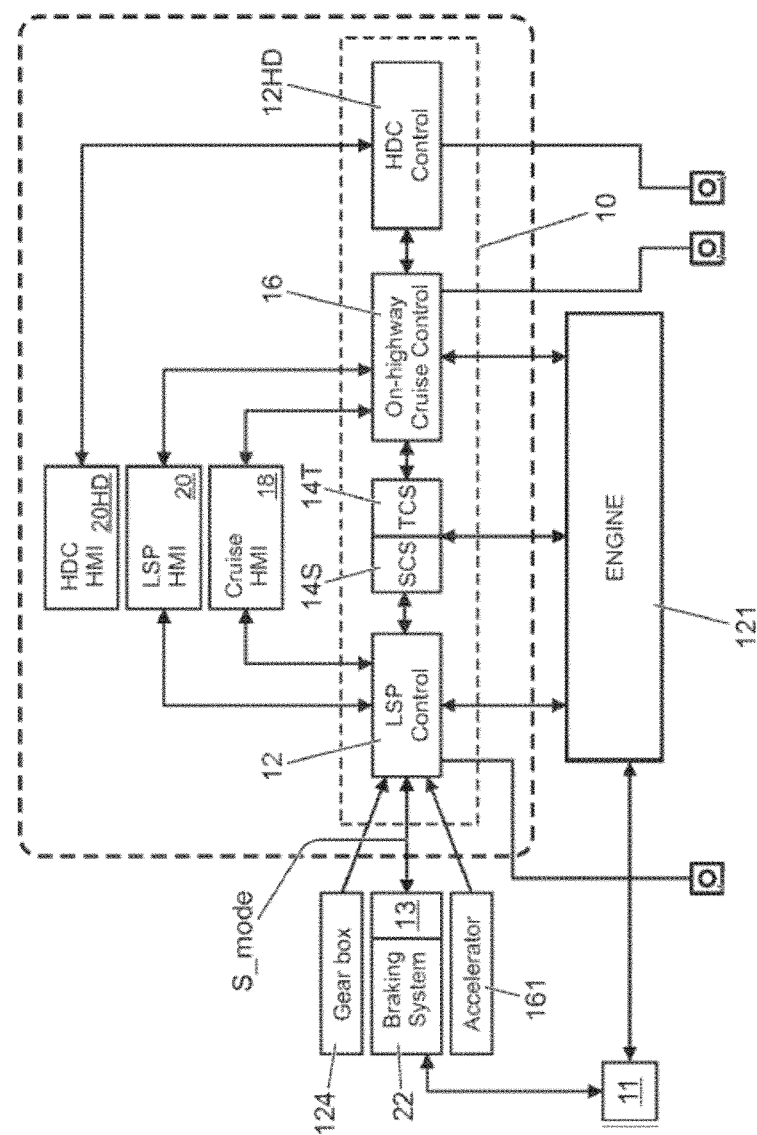
FIG. 3 shows a block diagram of a controller for controlling movement of a vehicle.

A control system for the vehicle 100 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors 1000 and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command the brake controller 13 to apply one or more brakes 111B, 112B, 114B, 115B of the vehicle 100 to help to steer the vehicle 100 in the direction the user wishes to travel. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by one or more further controllers.

Similarly, one or more of the controllers 10, 11, 13, 170C may be implemented in software run on a respective one or more computing devices such as one or more electronic control units (ECUs). In some embodiments two or more of the controllers 10, 11, 13, 170C may be implemented in software run on one or more common computing devices. Two or more controllers 10, 11, 13, 170C may be implemented in software in the form of a combined software module.

It is to be understood that one or more computing devices may be configured to permit a plurality of software modules to be run on the same computing device without interference between the modules. For example the computing devices may be configured to allow the modules to run such that if execution of software code embodying a first controller terminates erroneously, or the computing device enters an unintended endless loop in respect of one of the modules, it does not affect execution of software code comprised by a software module embodying a second controller.

It is to be understood that one or more of the controllers 10, 11, 13, 170C may be configured to have substantially no single point failure modes, i.e. one or more of the controllers may have dual or multiple redundancy. It is to be understood that robust partitioning technologies are known for enabling redundancy to be introduced, such as technologies enabling isolation of software modules being executed on a common computing device. It is to be understood that the common computing device will typically comprise at least one microprocessor, optionally a plurality of processors, which may operate in parallel with one another. In some embodiments a monitor may be provided, the monitor being optionally implemented in software code and configured to raise an alert in the event a software module is determined to have malfunctioned.

The SCS 14S, TCS 14T, ABS controller 22C and HDC system 12HD provide outputs indicative of, for example, SCS activity, TCS activity and ABS activity including brake interventions on individual wheels and engine torque requests from the VCU 10 to the engine 121, for example in the event a wheel slip event occurs. Each of the aforementioned events indicate that a wheel slip event has occurred. Other vehicle sub-systems such as a roll stability control system or the like may also be present.

Figure 4:
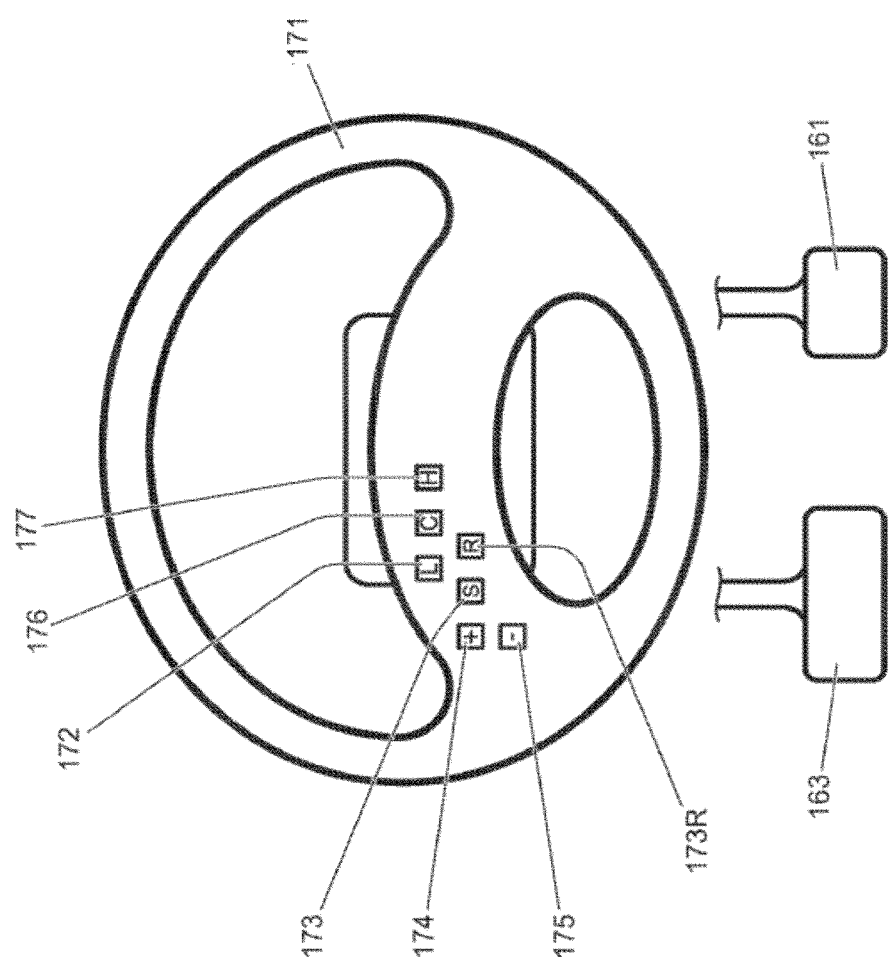
FIG. 4 shows a schematic view of main input devices within the vehicle.

As noted above, the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. Cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a cruise control increase set speed button, in the form of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following a driver over-ride intervention. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The LSP control system 12 also provides a speed-in dependence control system for the user, which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed. It is to be understood that in some embodiments the LSP control system selector button 172 may be mounted in a location other than on the steering wheel 171, such as in a dashboard or any other suitable location.

The LSP control system 12 is configured to allow a user to input a desired value of set-speed parameter, user_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of user_set-speed by setting a parameter LSP_set-speed equal to the value of user_set-speed unless the system 12 determines that a lower value of LSP_set-speed is required as discussed in more detail below with respect to FIG. 5. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel, user_set-speed, by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system 12, using the same control buttons 173, 173R, 174, 175. The HDC system 12HD is operable to allow the value of HDC_set-speed to be set to any value in the range from 2-30 kph.

It is to be understood that the VCU 10 is configured to implement a Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode or 'special programs off' (SPO) mode suitable for driving on a relatively hard, smooth driving surface where a relatively high surface coefficient of friction exists between the driving surface and wheels of the vehicle; a 'sand' driving mode (SAND) suitable for driving over sandy terrain; a 'grass, gravel or snow' (GGS) driving mode suitable for driving over grass, gravel or snow, a 'rock crawl' (RC) driving mode suitable for driving slowly over a rocky surface; and a 'mud and ruts' (MR) driving mode suitable for driving in muddy, rutted terrain. Other driving modes may be provided in addition or instead.

The sensors on the vehicle 100 include sensors which provide continuous sensor outputs to the VCU 10, including wheel speed sensors 111S, 112S, 114S, 115S, as mentioned previously and as shown in FIG. 1, and other sensors (not shown) such as an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, an inertial measurement unit (IMU), and water detection sensors forming part of a vehicle wading assistance system (not shown). In other embodiments, only a selection of the aforementioned sensors may be used. Other sensors may be useful in addition or instead in some embodiments. The collection of vehicle sensors is depicted schematically in FIG. 8 as vehicle sensors 1000.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

Figure 2:
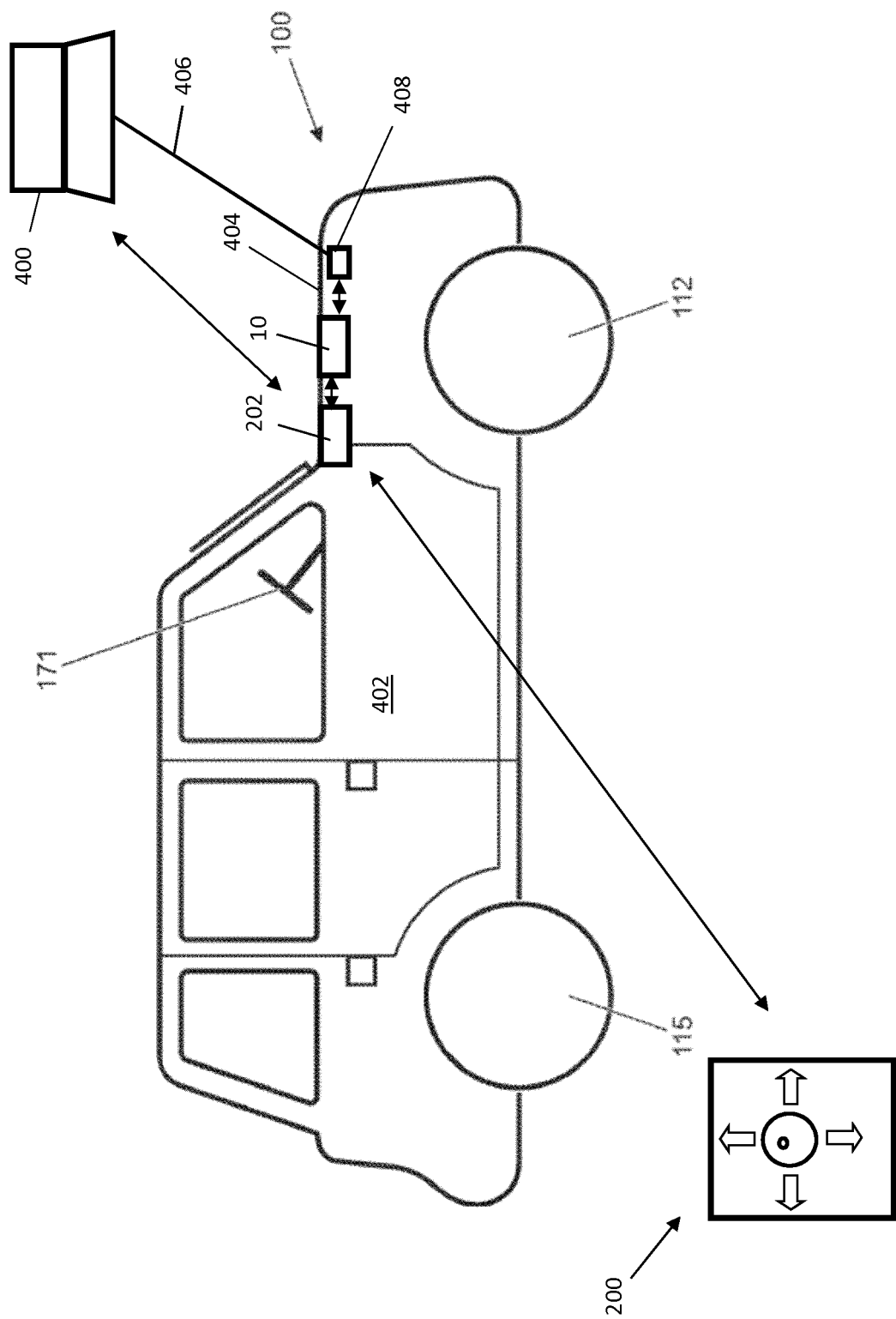
FIG. 2 shows a vehicle, an associated remote control device for use in controlling movement of the vehicle and an associated diagnostic device for use in maintenance of the vehicle.
Figure 8:
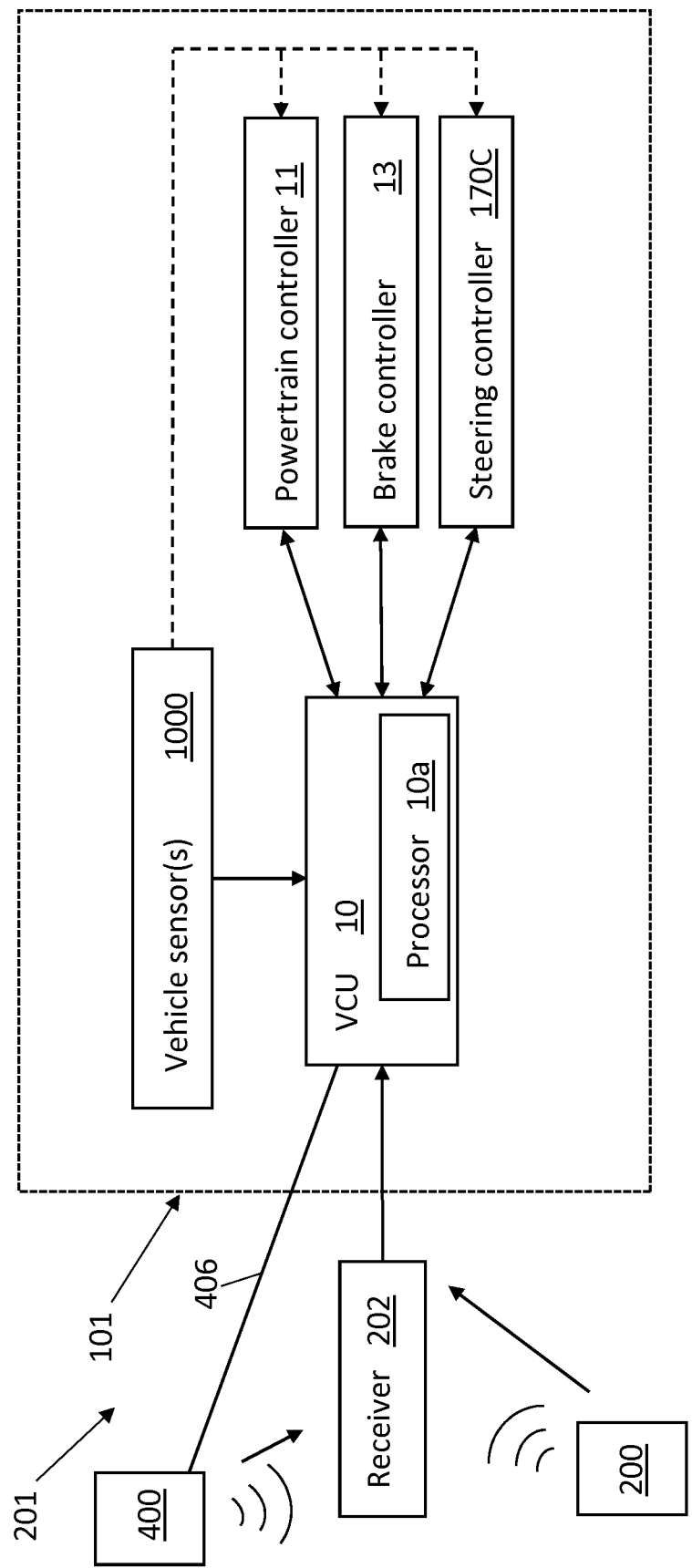
FIG. 8 shows a schematic view of a system and an apparatus for controlling movement of a vehicle according to the invention.

As shown in FIGS. 2 and 8, the controller 10 is configured to receive signals from a receiving means 202 arranged to receive transmitted signals from a remote control device 200 indicating a requested motion of a vehicle. A diagnostic device 400 may be connected to the vehicle 100, specifically to the VCU 10, for use in diagnosing the vehicle during a maintenance operation.

An example of a system 201 incorporating the apparatus 101 is shown in FIG. 8. The system includes the apparatus of FIG. 3 and a receiving means 202 in the form of a radio unit. The radio unit 202 may comprise a receiver and a transmitter or a transceiver configured to receive radio signals transmitted from a remote control device 200 and transmit signals to the remote control device 200. The radio unit 202 and the remote control device 200 may be arranged to provide a wireless local area network, via which two-way communication may take place between the radio unit 202 and the remote control device 200. For example, the radio unit 202 may be arranged to communicate by WiFi with the remote control device 200. In alternative embodiments other radio communication standards may be used for the communication. In one example, communication between the radio unit 202 and the remote control device 200 is provided via Bluetooth.

The connection between the diagnostic device 400, such as a portable computer, and the vehicle 100 may be made either via an electrical cable 406 to an OBU port 408, itself in communication with the VCU 10, or via a similar wireless communication protocol as the remote control device 200, as described above. The wireless communications with the diagnostic device may be made via the same receiver 202 as the remote control signals, or via a different, dedicated diagnostics receiver (not shown).

The remote control device 200 may be a portable device, which may be carried and used by a person outside of the vehicle 100. In an example, the remote control device 200 comprises a mobile phone (or cell phone) having an application to enable the person to provide manual inputs to request movement of the vehicle 100. For example, the manual inputs may include an indication of required throttle and braking, or a required speed, as well as required direction of travel (steering). The remote control device 200 is arranged to include data, indicative of the received user inputs, within the signals transmitted to the radio unit 202. The radio unit 202 is arranged to extract this data and provide the data to the controller 10.

The system enables a person to control movements of the vehicle 100 by remote control by providing user inputs to the remote control device 200. To enable such remote control, a two-way communication link is firstly established between the remote control device 200 and the radio unit 202. With the link established, the remote control device 200 may then be used to indicate to the controller 10 that a remote control mode enabling remote control movement of the vehicle 100 is requested. The controller 10 may determine whether one or more criteria are met before enabling remote control of the vehicle. For example, the controller 10 may determine whether a smart key (not shown) is present within the vehicle 100 and if it is, then remote control movement may be disabled or the maximum allowed speed of the vehicle may be set at zero.

With the communication link established, a user of the remote control device 200 is then able to provide manual inputs to the remote control device 200 to request and control movement of the vehicle, including an increase or decrease in speed or power, an increase or decrease in braking, gear selection, and direction of travel (steering). The remote control device 200 may generate data including information defining the requested movement, which is then transmitted to the radio unit 202 via the communication link.

The radio unit 202 determines the data defining the movement requested by the remote control device 200 and provides the data to the controller 10. The controller 10 provides output signals to the power steering controller 170C, the brake controller 13 and the powertrain controller 11 (incorporating the transmission controller) in dependence of the received data, and thus the user is able to operate the vehicle 100 remotely.

Signals output from certain types of sensors may be received and processed at a sub-modular level prior to onward transmission to the VCU 10. For example, signals from any or all sensors that may be indicative of the roll angle of the vehicle may be processed at a roll control module (e.g. a dedicated processor within the aforementioned roll stability control system) to determine an instantaneous roll angle and/or a rate of change thereof. Analogously, signals from any or all sensors that may be indicative of the pitch angle of the vehicle may be processed at a pitch control module (which may itself be part of the SCS or the HDC system 12HD for example) to determine an instantaneous pitch angle and/or a rate of change thereof. This is shown illustratively in FIG. 8, in which the dashed arrows from the vehicle sensors 1000 to the respective vehicle controllers 11, 13 and 170C depict optional connections for communicating data from the sensors 1000 to the respective controllers for onward communication to the central controller 10. Suitable sensors would include: a roll angle sensor; a pitch angle sensor; a vehicle inertial measurement unit (IMU); and suspension height sensors. The roll and pitch angle data determined at the respective roll and pitch control modules may be output to the VCU, where it may be used in conjunction with other inputs, such as the steering angle, vehicle speed and/or acceleration and vehicle traction, to determine an appropriate safe maximum speed for operation of the vehicle in a remote control mode in accordance with the conditions.

Figure 5:
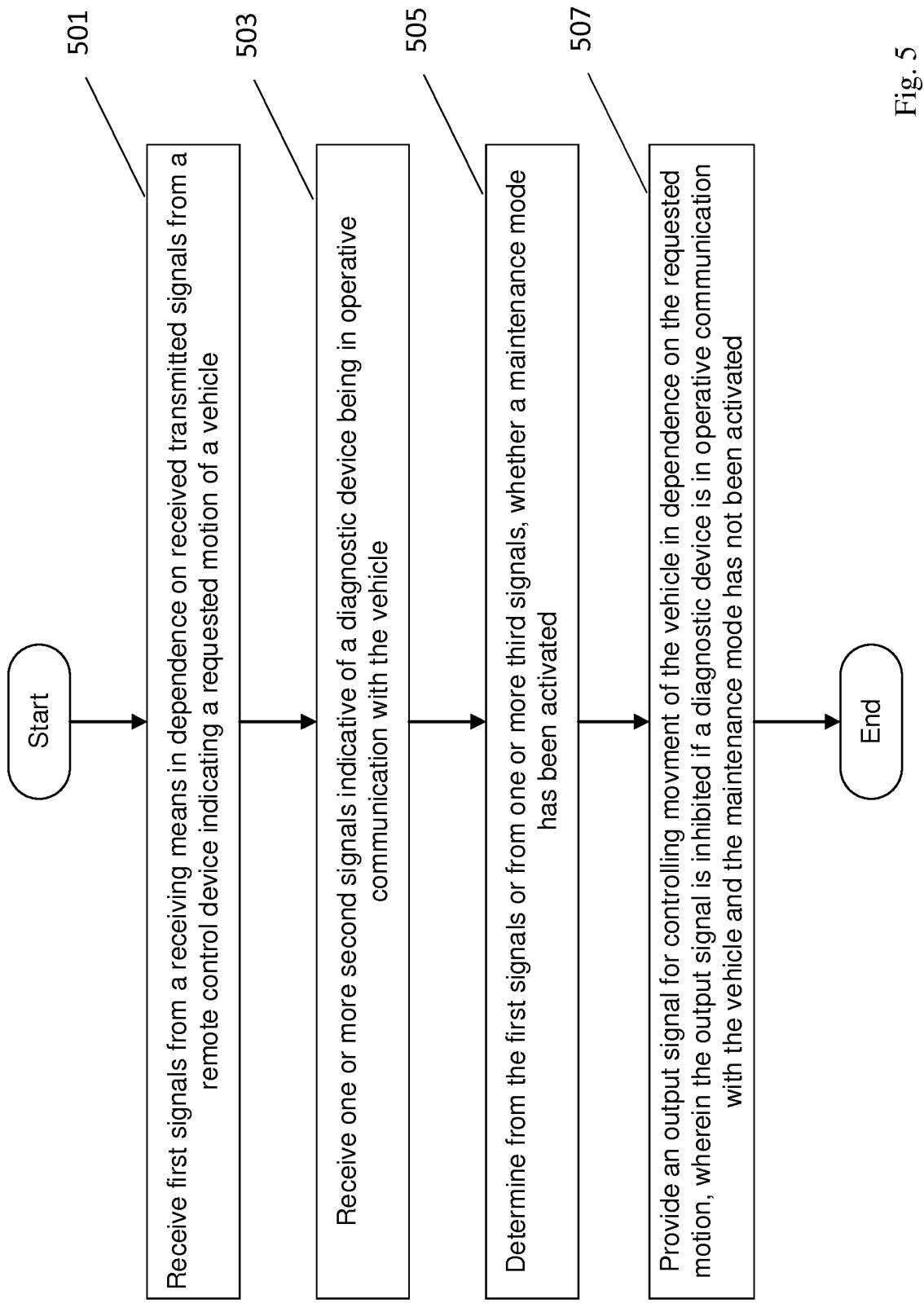
FIG. 5 shows a flowchart of a method of controlling the movement of a vehicle in a remote control mode according to one embodiment.

An example of a method for controlling the movement of a vehicle with a remote drive system is shown in FIG. 5. A schematic example of a processing means, in the form of a controller 10, for controlling movement of a vehicle is shown in FIG. 3. The controller 10 comprises a processor 10a arranged to perform a method embodying the present invention. A computer program, when executed by the processor 10a, is arranged to perform a method embodying the present invention. The computer program may be stored on a computer-readable medium.

A method 500 of controlling the movement of a vehicle 100 according to one embodiment is outlined by the flowchart shown in FIG. 5. At block 501 first signals are received from a receiving means in dependence on the receiving means receiving transmitted signals from a remote control device 200 indicating a requested motion of a vehicle 100. The first signals may be dependent upon the signal strength of the received transmitted signals.

At block 503, one or more second signals indicative of a diagnostic device 400 being in operative communication with the vehicle 100 are received by the controller 10. The second signals, for example, be signals on the CAN bus indicative of a physical connection of the diagnostic device 400 to the VCU 10 via the OBD port 408 and an electrical cable 406. Alternatively, the second signals may be indicative of a wireless connection established over a suitable wireless communications link between the diagnostic device 400 and the VCU 10, such as via the receiver 202. The controller 10, at block 505, determines from the first signals or from one or more third signals, whether a maintenance mode has been activated and at block 507 provides an output signal for controlling movement of the vehicle 100 in dependence on the requested motion. The output signal is inhibited if a diagnostic device 400 is in operative communication with the vehicle 100 and the maintenance mode has not been activated.

Hence, an inadvertent request made on the remote control device 200 for motion of the vehicle will be inhibited and will not result in action at the vehicle (such as movement of the wheels, the steering wheel or the brakes) unless both the diagnostic device 400 has been confirmed as being connected to the vehicle 100 and the maintenance mode has been enabled. As such, maintenance technicians can perform their duties safe in the knowledge that the vehicle cannot be operated remotely unless specifically enabled by the dual actions of connecting the diagnostic device and enabling the maintenance mode.

Figure 6:
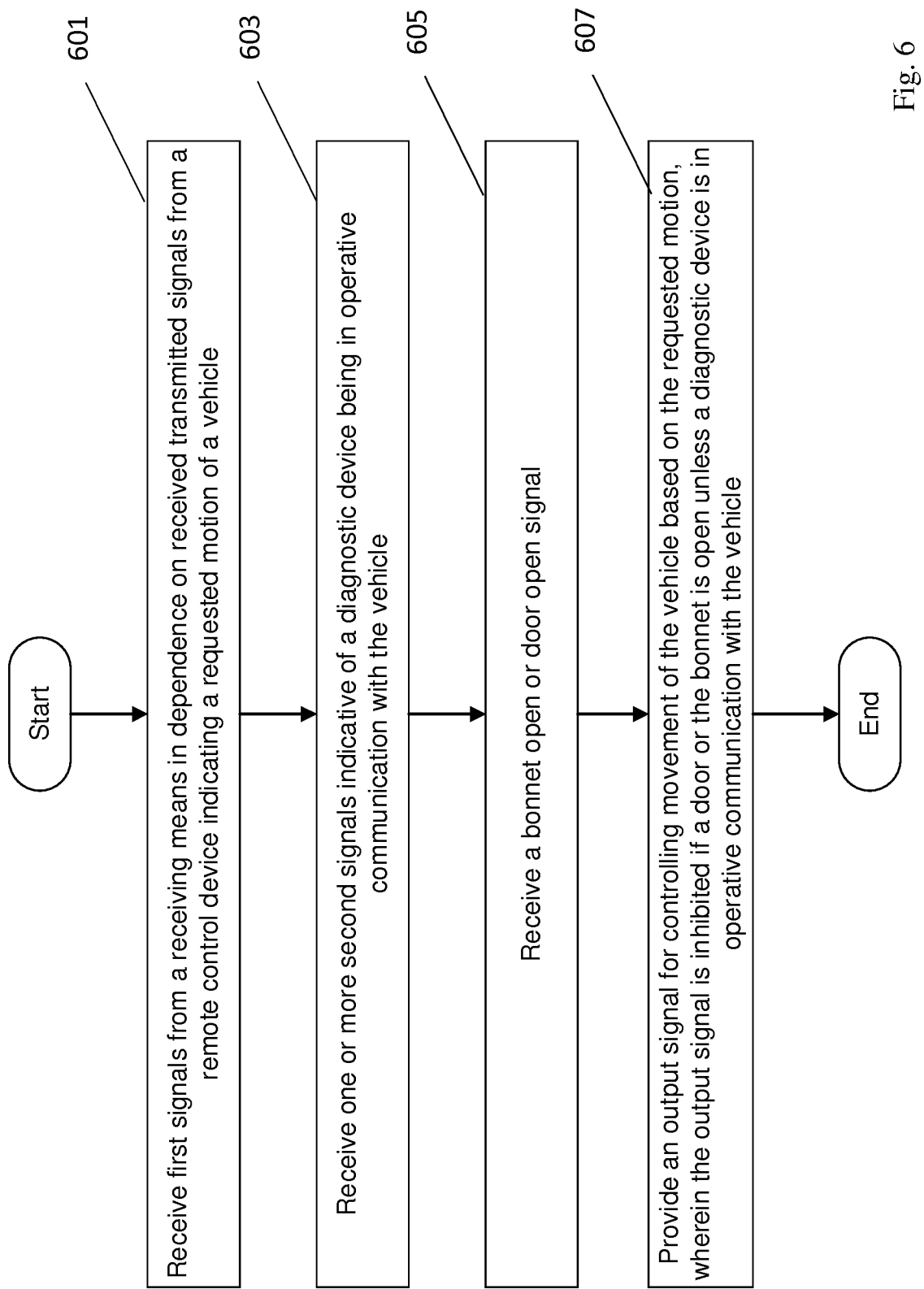
FIG. 6 shows a flowchart of a method of controlling the movement of a vehicle in a remote control mode according to another embodiment.

A method 600 of controlling the movement of a vehicle according to another embodiment is outlined by the flowchart shown in FIG. 6. At block 601 first signals are received from a receiving means in dependence on the receiving means receiving transmitted signals from a remote control device 200 indicating a requested motion of a vehicle 100. The first signals may be dependent upon the signal strength of the received transmitted signals.

At block 603, one or more second signals indicative of a diagnostic device 400 being in operative communication with the vehicle are received by the controller 10. The controller 10, at block 605, receives a bonnet open or a door open signal and at block 607 provides an output signal for controlling movement of the vehicle 100 in dependence on the requested motion. The output signal is inhibited if a door 402 or the bonnet 404 is open unless a diagnostic device 400 is in operative communication with the vehicle 100.

Hence, an inadvertent request made on the remote control device 200 for motion of the vehicle will be inhibited and will not result in action at the vehicle (such as movement of the wheels, the steering wheel or the brakes) unless both a door or a bonnet is confirmed as being open (e.g. through a signal from either or both of a door open sensor or a bonnet open sensor) and the diagnostic device 400 has been confirmed as being connected to the vehicle 100. As such, maintenance technicians can perform their duties safe in the knowledge that the vehicle cannot be operated remotely unless specifically enabled by the dual actions of opening a door 402 or the bonnet 404 and connecting the diagnostic device 400.

Figure 7:
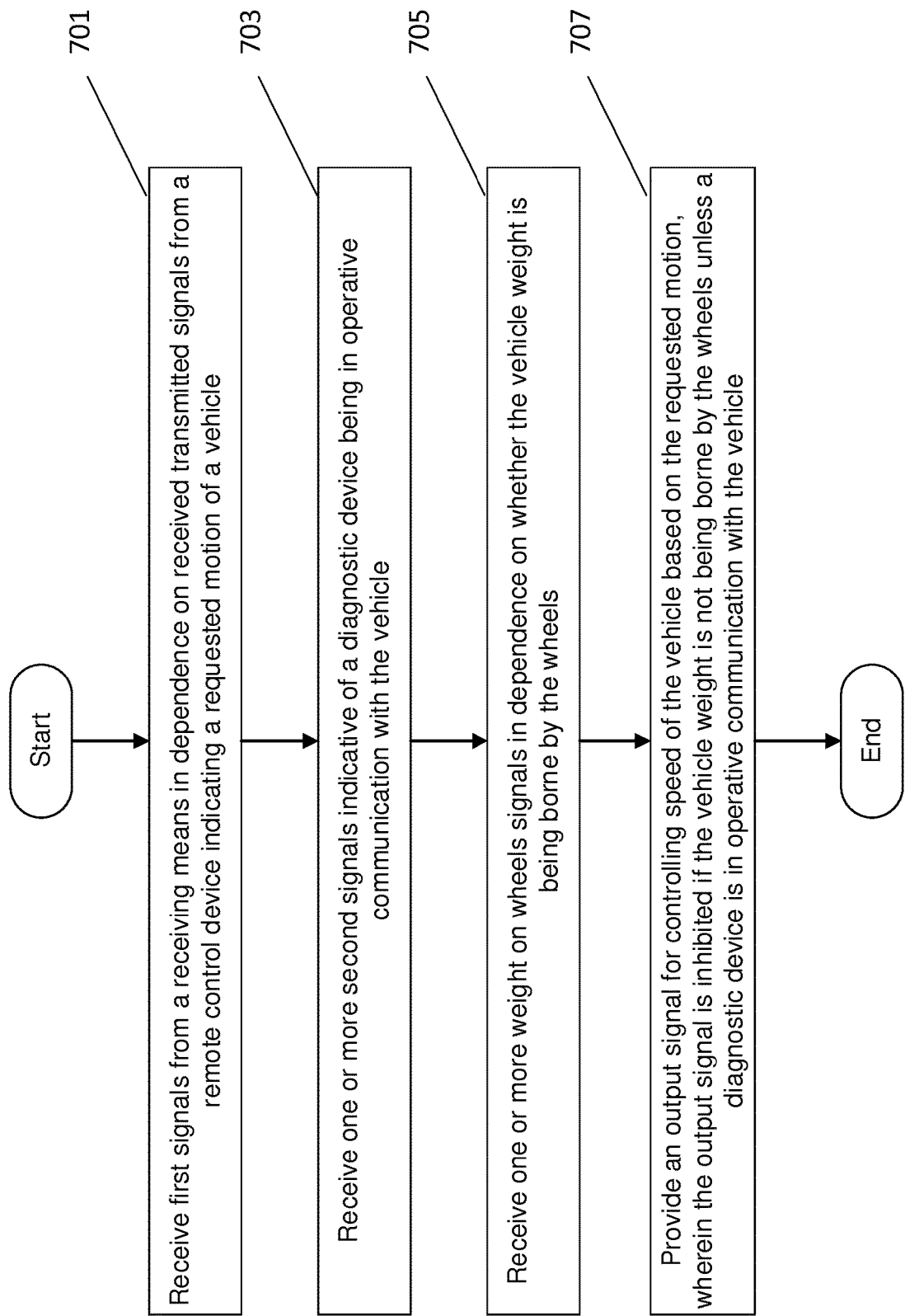
FIG. 7 shows a flowchart of a method of controlling the movement of a vehicle in a remote control mode according to yet another embodiment.

A method 700 of controlling the movement of a vehicle according to yet another embodiment is outlined by the flowchart shown in FIG. 7. At block 701 first signals are received from a receiving means in dependence on the receiving means receiving transmitted signals from a remote control device 200 indicating a requested motion of a vehicle 100. The first signals may be dependent upon the signal strength of the received transmitted signals.

At block 703, one or more second signals indicative of a diagnostic device 400 being in operative communication with the vehicle are received by the controller 10. The controller 10, at block 705, receives one or more weight on wheels signals in dependence on whether the vehicle weight is being borne by the wheels. If none of the wheels 111, 112, 114, 115 is bearing weight, then it can be inferred that the vehicle has been raised free of the ground, for example on a vehicle lift, and is therefore undergoing a maintenance operation. At block 707 the controller 10 provides an output signal for controlling movement of the vehicle 100 in dependence on the requested motion. The output signal is inhibited if vehicle weight is not being borne by the wheels unless a diagnostic device 400 is in operative communication with the vehicle 100.

Hence, an inadvertent request made on the remote control device 200 for motion of the vehicle will be inhibited and will not result in action at the vehicle (such as movement of the wheels, the steering wheel or the brakes) unless both the vehicle is confirmed as being raised clear of the ground (e.g. through one or more signals from wheel weight sensors) and the diagnostic device 400 has been confirmed as being connected to the vehicle 100. As such, maintenance technicians can perform their duties safe in the knowledge that the vehicle cannot be operated remotely unless specifically enabled by the dual actions of lifting the vehicle clear of the ground and connecting the diagnostic device 400.

Figure 9:
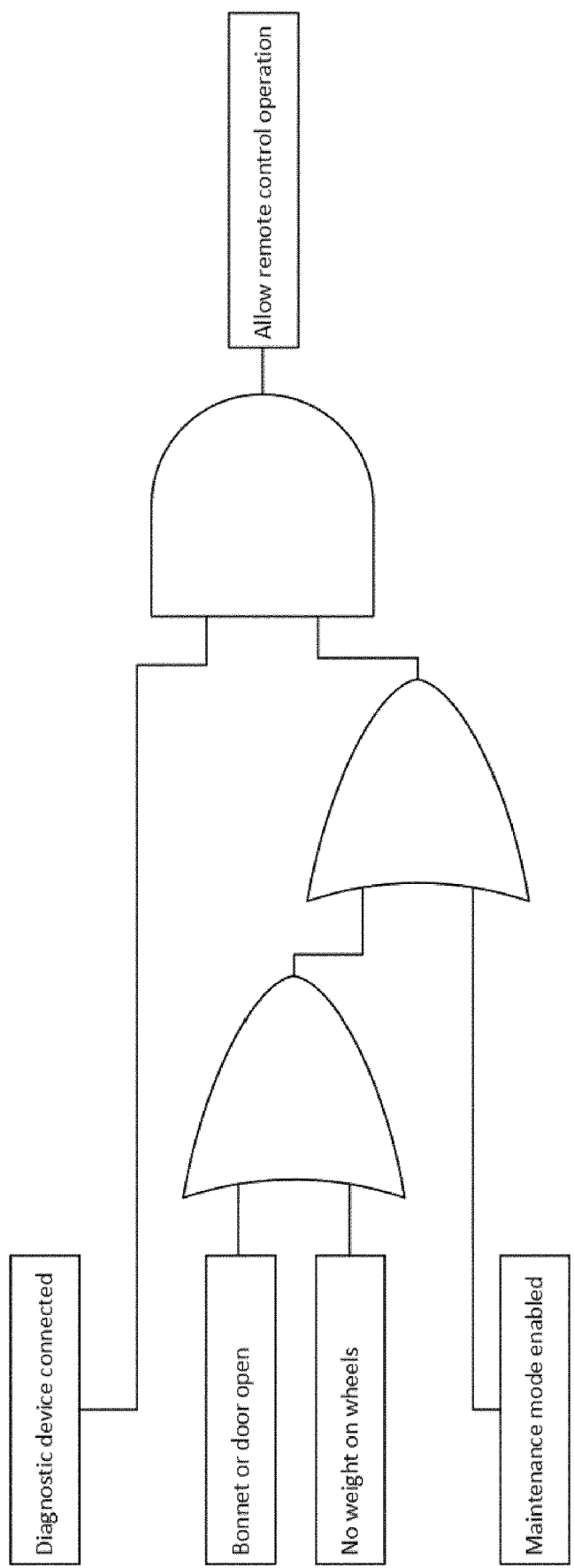
FIG. 9 shows a diagram of the logic underpinning whether the remote control operation will be allowed according to the invention.

These different scenarios are illustrated schematically in FIG. 9, which shows that when undergoing a maintenance operation, in order to allow the remote control mode of operation, then the diagnostic device 400 must be connected to the vehicle 100. In a first scenario, this provides the primary action to indicate that the vehicle is undergoing maintenance and the secondary action to permit the remote control mode is to enable the maintenance mode. In the second and third scenarios, however, the connection of the diagnostic device is the secondary action to permit the remote control mode, after it has been confirmed that the vehicle is undergoing maintenance through the primary action of opening the bonnet or a door (the second scenario) or lifting of the vehicle clear of the ground (the third scenario).

In certain embodiments, activation of the maintenance mode requires a specific primary user input to the remote control device 200, such as selecting a 'Maintenance Mode' through a user interface, and optionally confirming that selection through a secondary input, such as a 'Confirm' button on the user interface or by entering a code on a number pad of the user interface or a biometric input to the remote control device (e.g. a fingerprint scanner or through voice-recognition). Once the maintenance mode has been validly activated at the remote control device 200, an indication of the maintenance mode activation status is received at the receiving means 202 with the first signals (i.e. the maintenance mode activation status is transmitted together with any requests for motion from the remote control device), and this information is relayed to the VCU 10.

An indication of the maintenance mode activation status may alternatively be received with third signals which are received from the receiving means 202 in dependence on received transmitted signals from the remote control device 200 separate from the first signals (i.e. the maintenance mode activation status is transmitted independently of any requests for motion from the remote control device), and this information is relayed to the VCU 10.

Activation of the maintenance mode may thus require at least two distinct user inputs. These may be 'activate' and 'confirm' actions on a single device, as described above in the context of the remote control device 200—although those actions may equally have been taken through the diagnostic device 400 or the vehicle's control system, such as via a touch-screen user interface in the vehicle 100. Alternatively, the separate actions may be made on different devices (such as one action on the remote control device 200 and another on the vehicle control system or on the diagnostic device 400.

The inhibition of the output signal may be effected at the VCU 10, with the processor 10a not acting upon the requests from the remote control device 200. Alternatively, the inhibition may take place further 'upstream', for example by the receiver 202 not transmitting the request signals to the VCU 10, or through the remote control device 200 itself being prevented from transmitting the request signals. Because the communications link between the remote device 200 and the VCU 10 via the receiver 202 may not be entirely reliable (e.g. due to a dropped signal or noise), the remote device 200 is not deemed to be robust, and a signal to the remote control device 200 from the VCU 10 to inhibit the remote control mode function may not be received. It is therefore advantageous that the inhibition occurs at the VCU 10. A state machine within the VCU 10 (or a sub-module—in particular an ECU dedicated to controlling the remote control mode functions) will determine whether or not to execute the remote device requests; i.e. in this case inhibit if the conditions are not met.

In summary, aspects of the invention provide an apparatus and associated methods for ensuring safe maintenance of a vehicle having a remote control drive mode, inhibiting the remote mode if it is established that the vehicle is undergoing maintenance unless specific action is taken to override the inhibition. In one example, the action of connecting a diagnostic device to the vehicle confirms that a maintenance operation is underway, and to permit the remote control mode requires a separate action of enabling a maintenance mode. In another example, the act of opening the bonnet or a door of the vehicle is indicative of maintenance being undertaken. In yet another example, the act of lifting the vehicle off the ground, thereby taking all weight off the wheels, is indicative of maintenance being undertaken. In these latter two examples, the separate action to permit the remote control mode is connecting a diagnostic device to the vehicle.

References herein to a block such as a function block are to be understood to include reference to items of vehicle hardware, such as electronic modules, and to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An apparatus for controlling movement of a vehicle, the apparatus comprising an electronic processor electrically coupled to an electronic memory device having instructions stored therein, the electronic processor having an electrical input for receiving one or more signals, the electronic processor being configured to:
    receive first signals from a receiver in dependence on received signals transmitted from a remote control device indicating a requested motion of the vehicle;
    receive one or more second signals indicative of whether a diagnostic device is in operative communication with the vehicle;
    determine, from the first signals or from one or more third signals, whether a maintenance mode has been activated; and
    provide an output signal for controlling movement of the vehicle in dependence on the requested motion,
    wherein the output signal is inhibited if a diagnostic device is in operative communication with the vehicle and the maintenance mode has not been activated, and wherein the output signal is permitted if a diagnostic device is in operative communication with the vehicle and the maintenance mode has been activated.

2. The apparatus according to claim 1, wherein
    activation of the maintenance mode requires a specific user input to the remote control device, and
    an indication of the maintenance mode activation status is received with the first signals in dependence on the specific user input being detected, or
    an indication of the maintenance mode activation status is received with the third signals which are received from the receiving means in dependence on received signals transmitted from the remote control device separate from the first signals.

3. The apparatus according to claim 1, wherein activation of the maintenance mode requires at least two distinct user inputs.

4. The apparatus according to claim 3, wherein at least one of the user inputs is input via at least one of: a user interface on the vehicle and the diagnostic device in operative communication with the vehicle.

5. The apparatus according to claim 1, comprising receiving means for receiving the signals transmitted from the remote control device via a wireless local area network.

6. A vehicle comprising:
    an apparatus for controlling movement of the vehicle, the apparatus comprising an electronic processor electrically coupled to an electronic memory device having instructions stored therein, the electronic processor having an electrical input for receiving one or more signals, the electronic processor being configured to:
    receive first signals from a receiver in dependence on received signals transmitted from a remote control device indicating a requested motion of the vehicle;

receive one or more second signals indicative of whether a diagnostic device is in operative communication with the vehicle; determine, from the first signals or from one or more third signals, whether a maintenance mode has been activated; and provide an output signal for controlling movement of the vehicle in dependence on the requested motion, wherein the output signal is inhibited if a diagnostic device is in operative communication with the vehicle and the maintenance mode has not been activated, and wherein the output signal is permitted if a diagnostic device is in operative communication with the vehicle and the maintenance mode has been activated.

* * * * *